Patented Nov. 24, 1942

2,302,832

UNITED STATES PATENT OFFICE 2,302,832

BATTERY SEPARATOR

Abraham Sidney Behrman, Chicago, Ill., assignor to A. S. Behrman, trustee of Porous Rubber Products Trust, Chicago, Ill.

No Drawing. Application April 12, 1937, Serial No. 136,353

7 Claims. (Cl. 260—765)

This invention relates to the production of porous plates or diaphragms of the type used as separators in storage batteries and has particular reference to an improvement in the production of battery separators as described in my Reissue Patent No. 18,214.

A principal object of the invention is the provision of an improved method of manufacturing diaphragms or separators composed of an inert binder carrying an ultra microporous material, such as silica gel.

Another object is to provide an improved method of manufacturing gels and the combination of such gels in hydrogel form with an inert binder.

As disclosed in Patrick Patent No. 1,297,724 and in my Patent No. 1,755,496, solid, dry and relatively hard particles of silica gel are produced by reacting silica compounds with an acid or with an acid and ammonia to form a hydrogel from which the water of hydration is removed by drying. The resulting product retains its granular or particle form and acquires an ultimate density which may be of the order of 30 to 40 pounds per cubic foot. Other methods may be employed for producing dry silica gel of a lower density. As disclosed and claimed in my Reissue Patent No. 18,214, the dried silica gel is incorporated in an inert binder to produce a battery separator having a continuous scopic porosity.

In the production of battery separators and other articles of this type, such as diaphragms, there are certain factors such as ease of compounding the porous material with the binder and the cost of the process and resulting article which must be taken into account.

When particles of pre-dried silica gel are mixed with the binder there is a definite tendency for the ultra microporous phase of the resulting diaphragm to retain its initial discrete particle condition. I now have found that effective results may be obtained by combining with an inert binder a gel product which still is in the hydrogel condition. That is, in accordance with the present process, the material employed to impart a continuous porosity to the diaphragm consists of an ultra microporous gel, such as silica gel, which has been produced in the form of a hydrogel and which has not been dried sufficiently or otherwise treated to prevent it constituting a hydrogel in the presence of water.

Silica hydrogel may be produced by combining an alkaline silica compound with an acid or with an acid and ammonia in accordance with well known formulae. The process is carried out in a relatively dilute solution which sets up into a hydrogel which may contain approximately 93 per cent water or mother liquor. The hydrogel has a firm, stiff body, which after a time may contract slightly to squeeze out a small quantity of water by synaeresis. The hydrogel may be produced by the process described in my Patent No. 1,755,496, in which solutions of sodium silicate, sulfuric acid and ammonium hydroxide are combined to produce a silica hydrogel of high concentration.

I have found that a hydrogel of this type may be incorporated to advantage in an inert binder to form battery separators or the like without previously changing the hydrogel into dry particles which will not revert to hydrogel with water. This hydrogel is different from irreversible dried gel particles and constitutes an ordinary coagulated hydrosol which has not been dehydrated to the transition point at which it loses its property of being a soft jelly-like mass in admixture with water. The production of separators from hydrogel may follow various lines of procedure. An inert binder which has proved highly successful consists of hard rubber and the production of separators from hydrogel will be described with reference to this material.

After incorporation of the hydrogel in the rubber binder to form separators, the latter generally are eventually dried. A hydrogel containing 93 per cent generally is too slippery to work well on calender rolls and in the drying procedure is apt to shrink to such an extent as to weaken the structure of the separator. Consequently, in the formation of the composite diaphragms it is preferred to subject the hydrogel to a water-reducing procedure which will not change the character of the material from a hydrogel. A hydrogel containing its original amount of water may be subjected to a pressure of the order of 100 to 150 pounds per square inch in an hydraulic press and will lose a sufficient quantity of the mother liquor to reduce the original volume of the hydrogel by about 60 per cent, thereby increasing the silica concentration to approximately two and one-half times its original value.

The pressed hydrogel will have a water content of about 82 per cent, and the silica concentration will be of the order of 7 to 8 pounds per cubic foot when broken into small pieces. Also, it will be found that the pressed hydrogel largely has lost its original slippery character and becomes easily granulated and crumbly, even though it definitely retains its hydrogel structure. In such condition the hydrogel of reduced water content may be incorporated in a rubber medium by any suitable method as by combining with rubber latex, smoked rubber or sheet rubber. The hydrogel is worked into the rubber by means of a suitable mill which produces a thorough mixture. Thereafter the rubber compound is shaped and cured.

The combination of the hydrogel with a rubber binder and shaping and curing or vulcanizing of the rubber to impart rigidity to the finished article usually includes a drying step which removes water from the hydrogel without displacing it from its position in the binder. This dehydration may be accompanied by a shrinkage which reduces the volume of the gel to an extent which may weaken the separator structure and cause cracking. Particularly is this weakened tendency noticeable in the case of a rubber latex separator. In the case of some hydrogels a relatively large proportion of rubber latex is necessary to prevent undue cracking.

A desirable procedure consists in subjecting the pressed hydrogel to a partial drying step in which the water content is reduced still further without destroying the hydrogel characteristics of the material before the gel is incorporated in the binder. This partial drying greatly reduces the amount of shrinkage which occurs subsequently when the composite separator is dried, and further reduces the slippery characteristics of the hydrogel, the latter factor being of importance where the hydrogel is worked into the rubber binder with mixing rolls.

The hydrogel may be treated in another way to reduce the shrinkage factor. In this other method of treatment the pressed hydrogel is subjected to heat treatment in an autoclave in which no substantial drying occurs. For example, I have found that subjecting the pressed hydrogel to the action of saturated steam under pressure of 75 to 80 pounds per square inch for four hours will result in the structure of the hydrogel "setting" to such an extent that separators produced by compounding the autoclaved hydrogel with a binder are not unduly weakened by the drying step to which they are subjected. A typical pressed and autoclaved hydrogel will have an ultimate density of the order of 12 to 15 pounds when subsequently dried, which corresponds to a shrinkage to about one-half its original volume, as compared to a shrinkage to about one-fourth its original volume in the case of an un-autoclaved hydrogel. Autoclaving an unpressed hydrogel under the same conditions results in a density of about 22 pounds per cubic foot when the gel is dried, which is considerably more than in the case of an autoclaved pressed gel.

The effect of the autoclaving seems to be a function of both time and pressure of steaming, and to some extent a deficiency in pressure may be compensated for by an increase in time of treatment, and vice versa. Even steaming at atmospheric pressure has an effect in setting the gel structure, but I have found that steam pressures of much above 200 pounds per square inch do not have an effect commensurate with the expense and effort involved.

The autoclaved pressed hydrogel may be further partially dried without destroying the hydrogel structure prior to incorporation with the rubber. If desired, the hydrogel may be worked into the rubber with dried particles which will give the mixing rolls a better "bite."

It will be understood that the salts may be washed out of the hydrogel at any convenient stage of the process. The washing may be before or after the autoclaving. Frequently, the washing may be postponed until the hydrogel is incorporated into the separator. For some uses it is not necessary to wash out the salts. An acid wash may be used to remove any iron or ammonia.

In producting battery separators a pressed autoclaved hydrogel of about 80 per cent moisture may be ground with concentrated latex, containing about 60 per cent rubber, to which has been added the proper amounts of sulfur and accelerator, substantially equal quantities of weight of the hydrogel and the rubber being employed. The resulting viscous mass is molded or otherwise formed into the separator sheet. Hydrogels formed in accordance with my Patent No. 1,755,496 generally are slightly ammoniacal, so that no coagulation of latex occurs as would be the case with acid hydrogels. A small amount of other substances such as wood fibre may be included with the hydrogel. For instance, a separator may be produced by employing 50 parts by weight of hydrogel, 10 parts by weight of wood flour and 60 parts by weight of latex compound containing sulfur and an accelerator.

In molding the separator compound it may be desirable to employ a cloth backing for the separator sheet, for convenience in subsequent handling. The cloth also appears to reduce the tendency for the formation of a thin layer of relatively pure rubber at the surface of the sheet.

After being formed the separator sheet is vulcanized. In many cases it will be desirable to immerse the separator sheet in an acid bath prior to vulcanization to coagulate the lattex and neutralize the ammonia which may be in the hydrogel, although this step is not to be considered essential. Ordinarily the formed separator sheet will be subjected to a drying step either before or after vulcanization. As previously described, the drying causes the hydrogel to tend to shrink, and unless the separator has been vulcanized the rubber tends to diminish in volume along with the hydrogel. Generally, it is preferred to delay the drying step until after the separator is cured in an atmosphere of steam.

By extending the conditioning treatment it is possible to produce a hydrogel from which the water may be removed without destroying the hydrogel characteristics of the material. By one known process, the hydrogel is washed with a non-peptizing liquid such as alcohol to replace the water in the gel and then is heated to and dried at a temperature above the critical temperature of the alcohol, the resulting material being a fluffy, powdery gel of very low apparent density. However, upon the addition of water this fluffy gel again becomes a hydrogel and loses its discrete particle form. As rehydrated the gel may be employed in producing separators as described herein.

The procedure for incorporating hydrogels which have not been autoclaved or hydrogels which have been pressed, autoclaved and reduced in water content by evaporation or hydrogels which have been pressed and partially dried may be substantially as described. The compounding procedure whereby the hydrogel is incorporated in the binder consists in mixing a sufficient quantity of the hydrogel with the rubber to produce the desired continuous porosity, a sufficient quantity of the binder being employed to impart the necessary strength and form to the finished article. The hydrogel seems to form a more nearly continuous phase in the binder than do discrete particles of previously completely dried gel. This may be due to the more fluid or plastic condition of a hydrogel which permits of a more continuous dispersion in the binder even when the separator is dried and the gel loses its hydrogel characteristics.

When the formed separator is dried, before or after the vulcanization step, the loss of moisture by the hydrogel and resultant shrinkage causes the formation of voids in the rubber binder which increase its porosity and permeability considerably. As the hydrogel is in a state of intimate and uniform distribution, there remains in the rubber a network of communicating openings or spaces.

The technique of producing and conditioning the hydrogel may vary widely as may the method of incorporating the gel in the binder. Rubber has been specified as a preferred binder but other materials inert to the conditions to which the article is subjected may be employed. In some cases asphaltum or synthetic materials such as phenol formaldehyde condensation products may be utilized. Ultra microporous hydrogels of other materials than silica may be employed for some purposes and various materials may be combined in the separator for special purposes.

Other inorganic gels such as metallic oxide gels alone or in combination with silica may be treated in the manner described to produce gels of low density. Other examples include aluminum oxide-silica gels, gels of vanadium oxide, iron oxide or hydroxide, and gels of the zeolitic type such as those composed of sodium oxide, aluminum oxide and silica. I have found that low density gels produced in this manner have improved catalytic characteristics.

An important advantage of the process as described herein is in its economy. The hydrogel is considerably less expensive than dried gel, since the expense of complete drying is avoided, and the voluminous nature of the gel as used makes it possible to produce separators from a substantially less weight of gel than in the case of the use of dry, hard particles.

The various possible changes which may be made in the disclosure herein without departing from the scope of the invention are intended to be included in the appended claims.

I claim:

1. The method of producing compositions of the type described, which comprises producing an inorganic hydrogel dispersed in a relatively large quantity of water and being relatively slippery, dehydrating said hydrogel sufficiently to render it crumbly without destroying its hydrogel characteristics, and mixing said partially dehydrated hydrogel with a binder.

2. The method of making compositions of the type described, which comprises producing a silica hydrogel dispersed in a relatively large quantity of water and being relatively slippery, dehydrating said hydrogel sufficiently to render it crumbly without destroying its hydrogel characteristics, and producing a dispersion of said partially dehydrated hydrogel in a rubber binder.

3. The method of making a composition of the type described, which comprises producing an inorganic hydrogel dispersed in a relatively large quantity of water and being relatively slippery, dehydrating said hydrogel sufficiently to render it crumbly without destroying its hydrogel characteristics, producing a dispersion of said partially dehydrated hydrogel in an uncured rubber binder, shaping said binder into the desired form, vulcanizing said binder, and subjecting the resulting article to a drying operation to convert the dispersed hydrogel into irreversible particle form.

4. The process of claim 3 in which the inorganic hydrogel consists of silica hydrogel.

5. The method of producing compositions of the type described, which comprises producing an inorganic hydrogel, subjecting the hydrogel to the action of heat and pressure under autoclaving conditions without destroying its hydrogel characteristics, mixing the resulting autoclaved hydrogel with an uncured rubber binder, and vulcanizing the rubber.

6. The method of producing compositions of the type described, which comprises providing an inorganic hydrogel dispersed in a relatively large quantity of water and being relatively slippery, dehydrating said hydrogel sufficiently to reduce its slipperiness and to render it crumbly without destroying its hydrogel characteristics, producing a dispersion of said partially dehydrated hydrogel in an uncured rubber binder, vulcanizing said rubber binder, and subjecting the dispersed hydrogel to further dehydration to convert said dispersed hydrogel into irreversible particle form.

7. The method of producing compositions of the type described, which comprises providing an inorganic hydrogel dispersed in a relatively large quantity of water and being relatively slippery, dehydrating said hydrogel sufficiently to reduce its slipperiness and to render it crumbly without destroying its hydrogel characteristics, producing a dispersion of said partially dehydrated hydrogel in an uncured rubber binder, and vulcanizing said rubber binder.

ABRAHAM SIDNEY BEHRMAN.